Patented Feb. 27, 1923.

1,446,725

UNITED STATES PATENT OFFICE.

HERBERT D. SHAMBERG, OF NEW YORK, N. Y.

MEANS OF HEATING AND VENTILATING MOTOR-DRIVEN VEHICLES.

Application filed December 6, 1921. Serial No. 520,250.

*To all whom it may concern:*

Be it known that I, HERBERT D. SHAMBERG, a citizen of the United States, residing at New York city, in the county of New York and State of New York, have invented new and useful Improvements in the Means of Heating and Ventilating Motor-Driven Vehicles, of which the following is a specification.

The object of the invention is to provide a simple and effective means of heating and ventilating the front seating compartment of a motor-driven vehicle, or other portion of the interior if desired, and also to provide a protection for the hood covering the engine against the excessive engine heat which causes the destruction of the paint or finish of the hood before the finish of the rest of the car has deteriorated materially through natural wear and weathering. It is well known that, due to the heat of the engine, the hood or bonnet which covers and encloses the engine space soon becomes affected in its external finish, and that the cracking, burning and discoloration of its paint detracts from the general appearance of the car long before the finish on the rest of the body has weathered. The purpose of this invention, therefore, is to overcome this difficulty and avoid the expense of early refinishing, and at the same time to secure important advantages in the way of ventilating and also heating the passenger space. The object is also, on the one hand, to insulate the forward compartment from the heat of the engine, and to provide means for retaining the heat of the engine under hood in cold weather after it has been stopped, thereby aiding in re-starting the engine.

In the accompanying drawings, forming a part hereof:

Figure 1:
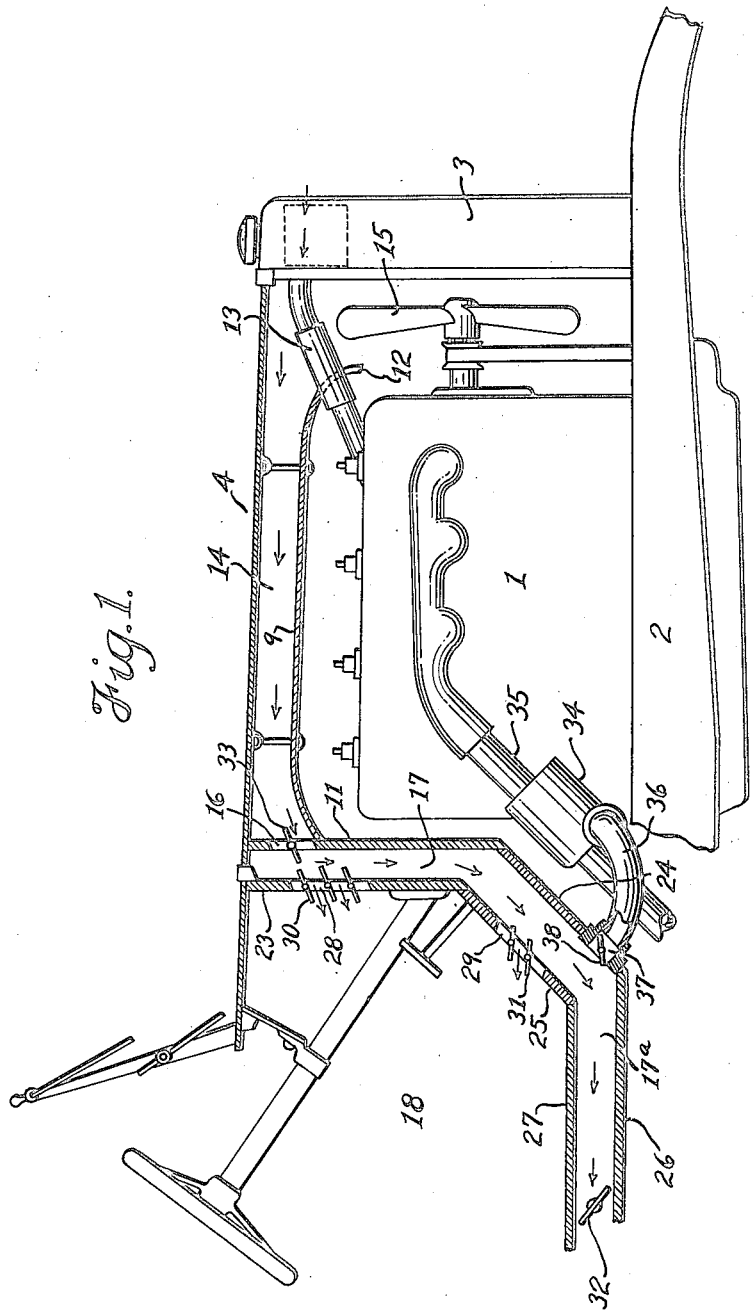
Fig. 1 is a vertical longitudinal section through the forward part of an automobile, showing the power plant and radiator in elevation.
Figure 2:
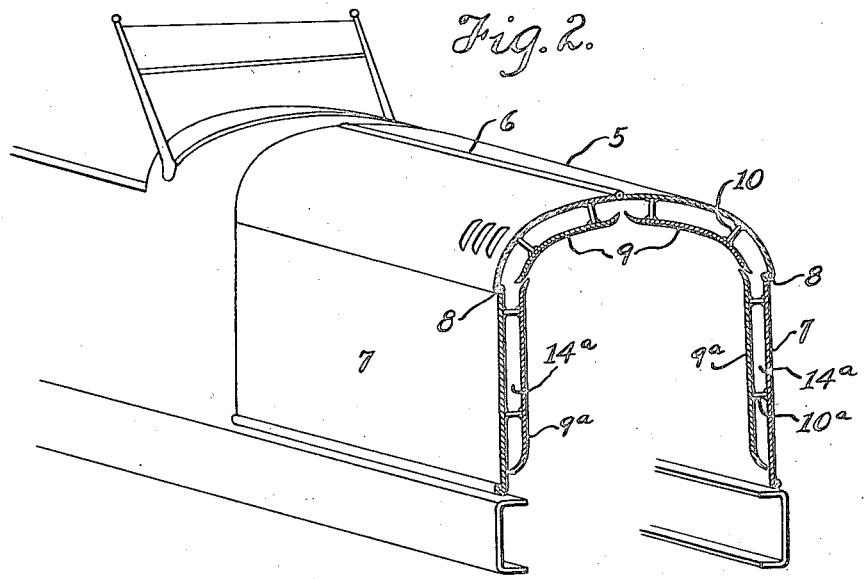
Fig. 2 is a perspective view, with the forward part of the hood in transverse section and the power plant omitted.

The engine 1 is mounted as usual on the frame 2, with the radiator 3 in front and with the engine space between the radiator and the dash covered and enclosed by a hood 4. The hood may be of a known construction, comprising two top sections 5, 5 hinged on a central longitudinal hinge 6 and two side flaps 7, 7 hinged at 8, 8 to the top sections.

In accordance with the invention a wall or walls 9 are supported from and a short distance beneath the top sections of the hood, suitable spacers 10 being used for this purpose. This wall 9 extends longitudinally above the engine from a point somewhat in rear of the radiator to a vertical wall 11 behind the engine. The forward end 12 of the wall is bent downward to afford an enlarged air entrance, and is suitably arranged to accommodate the water connection 13 which passes from the top of the engine jacket to the upper part of the radiator. The wall 9 with the outer wall of the hood forms a fresh air passage 14, through which air passing through the radiator and drawn by the fan 15 travels rearward above the engine to an opening 16 in the upper part of the wall 11, said opening constituting an inlet to a further air passage 17 bordering the passengers' space, or more specifically the driver's compartment 18. The air space 14 also affords insulation to keep the extreme heat of the engine from the outer wall of the hood, this insulation being rendered more effective by reason of the current of cool air which passes through the space. Similar insulation chambers 14$^a$ are formed at the inner sides of the flap walls 7 by means of inner walls 9$^a$ supported in spaced relation therefrom by spacers 10$^a$. The walls 9 and 9$^a$ are preferably made of some heat-insulating material.

Figure 3:
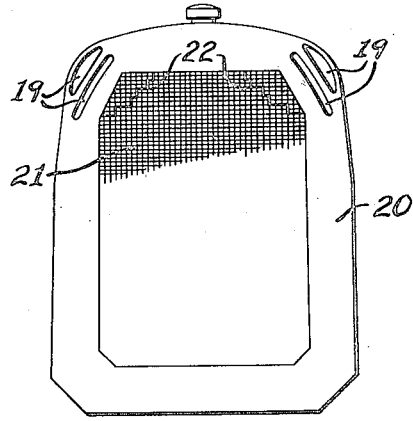
Fig. 3 is a front elevation of the radiator.

As represented in Fig. 3, special air openings 19 may be provided through the upper corner portions of the frame 20 of the radiator, and, so that the air which reaches the air tunnel 14 may be heated as little as necessary, the core 21 may be provided with special upper portions 22 in which there are the usual air passages but no water passages.

The wall 11 behind the engine forms part of a double-dash and floor construction, the wall 11 being parallel to and spaced from the dash 23 and at its lower portion being continued downward and inclined rearward at 24 in parallelism with the footboard 25, and thence horizontally rearward at 26 beneath the floor-boards 27. From the air passage 17 between these spaced walls there are suitable outlets, at different points, to the interior of the car. These include an opening 28 through the upper part of the dash 23 and an opening 29 through the foot-boards 25. These openings can be opened and closed by shutters 30, 31, and in addition there may be other openings, through the floor-boards, to the passengers' space, at points in the rear. The horizontal portion 17ª of the interwall chamber may extend rearward beneath the rear compartment, if there be one, or may terminate beneath the driver's compartment. In any event, in addition to affording means for ventilating and heating such spaces, the construction affords the further advantage of protecting the passengers from the heat of the engine and also from the cold beneath the floor-boards in cold weather. Furthermore, the double-wall insulation around the engine tends to retain the engine heat after the engine has been stopped, at which time the shutters 30 and 31, and likewise a shutter or valve 32 in the horizontal conduit 17ª and a valve or shutter 33 commanding the opening 16, can be closed or otherwise regulated to suit conditions.

The construction thus far described makes it possible to conduct a current of cold, outside air from in front of the radiator, through the radiator and above the engine space, to the double-wall construction between the engine space and the passengers' compartment, from which it is distributed through shuttered openings, such as 28 and 29, to the interior of the car. The same system also provides for heating the car when desired. For this purpose a stove 34 is placed on the exhaust pipe 35, or on the exhaust manifold, and from it a heated air conduit 36 passes to an opening 37 in the lower part of the interwall conduit 17. This opening is also commanded by a valve 38, which can be opened or closed or regulated as desired. When the heating function of the system is being employed, the fresh air valve 33 will be closed, so that heated air will be distributed through the openings 28 and 29, or the valve 33 could be left partly open if it were desired to admit warm air around the feet and cooler air above.

What is claimed as new is:

In an automobile having a hood enclosure containing an engine, and a passenger body behind the hood enclosure, the combination of a wall beneath the hood and above the engine, forming a cool-air passage protecting the hood from the effects of heat, double walls forming a passage bordering the front and lower parts of the interior of the body and having openings thereto, said bordering passage being substantially cut off from the engine space and having an entrance at the top from the cool-air passage, and another entrance in its lower part, means for supplying heated air from the engine to such lower entrance, and devices for regulating the admission of cool and heated air to the respective entrances to the bordering passage.

HERBERT D. SHAMBERG.